June 8 1965 M. A. FULLER 3,187,494
HOSE WINDING APPARATUS
Filed July 16, 1963 5 Sheets-Sheet 4

INVENTOR.
MERLE A. FULLER
BY
ATTY.

June 8 1965 M. A. FULLER 3,187,494
HOSE WINDING APPARATUS
Filed July 16, 1963 5 Sheets-Sheet 5

INVENTOR.
MERLE A. FULLER
BY
ATTY.

United States Patent Office 3,187,494
Patented June 8, 1965

3,187,494
HOSE WINDING APPARATUS
Merle A. Fuller, Barberton, Ohio, assignor to The B. F. Goodrich Company, New York, N.Y., a corporation of New York
Filed July 16, 1963, Ser. No. 295,362
12 Claims. (Cl. 57—9)

This invention pertains to an apparatus for winding filamentary reinforcement material in a helical form in preselected reverse helical paths about a winding mandrel, and, more particularly, the invention pertains to an apparatus for manufacturing hose having multiple continuous plies of helically wound wire of relatively large gauge.

As disclosed in my prior patent, No. 3,037,343, dated June 5, 1962, rubber hose reinforced with two or more plies of resilient wire wound in closely spaced parallel helical convolutions has been found to have significant advantages in high pressure service over similar hose reinforced with plies of braided wire. My former patent disclosed a method and apparatus for producing such hose in which resilient wires were wound about a rubber tube mounted on a mandrel as the mandrel was rotated while being moved axially in one direction. As the demands of industry increased, necessitating hose having greater and greater working pressures and correspondingly greater ultimate strengths, it became necessary to utilize reinforcing wires of much larger gauges and also to incorporate more plies of such wires to attain such strengths. In order to facilitate the handling of these larger gauge wires, on the order of 0.100 inch in diameter and greater, it was found desirable to apply all plies to the hose carcass in a more or less continuous operation, obviating the necessity of cutting the wire at the ends of the mandrel at the completion of each ply application and then reattaching it for application of the next ply. It followed then that it would be desirable for such wires to be continuously applied as the mandrel moved through the apparatus in alternatingly reverse directions, cutting the wire only upon completion of the last ply's application.

It is an object of this invention, therefore, to provide an apparatus for winding one or more strands of filamentary material in preselected, reverse, helical paths about a winding mandrel.

It is another object of this invention to provide an apparatus for winding a plurality of heavy gauge wires in closely spaced, preselected, reverse helical paths about a partial hose carcass.

It is a further object of the present invention to provide an apparatus as defined in the preceding paragraph, wherein relatively heavy gauge wire reinforcing material may be wound about a winding mandrel having a partial hose carcass mounted thereon in preselected reverse helical paths, and wherein said wire may be formed as it is led to the hose carcass, so that each ply tends to exert a resilient radial compressive force on the portions of the hose carcass surrounding the plies, either by tending to expand relative to the underlying carcass portions or to grip the underlying carcass portion, depending upon the nature of the service for which the hose is intended and the particular type of end fittings to be assembled on the hose.

Further objects and advantages to be gained through the use of this invention will be obvious to those experienced in the art to which it pertains from the detailed description of the presently preferred embodiment which follows, and with reference to the accompanying drawings forming a part of this application in which.

*General assembly*

With reference to FIGURES 1a, 1b and 2a, 2b, it will be seen that the apparatus comprises a wire forming and distribution assembly A centrally mounted on the apparatus. Disposed beneath assembly A are two pairs of parallel tracks 10 and 11. Mounted on the lower tracks 11 is a head chuck drive assembly B and a tail chuck drive assembly C. A mandrel 12 is supported between assemblies B and C in such a manner that its longitudinal axis coincides with the work axis of assembly A. To the rear of the apparatus is situated a wire creel D, the details of which are not shown since they form no part of this invention. The wire let-off and tensioning units of creel D may be of any suitable type, such as that disclosed in the patent of Ralph F. Cooper, No. 2,920,840.

The wires 13 are trained from the wire creel D to the wire forming assembly A and thence to the mandrel 12, passing therethrough. As the chuck assemblies B and C are moved in reverse directions along tracks 11 and as the mandrel 12 is rotated about its longitudinal axis by means hereinafter described, the wire is preshaped and applied to the mandrel 12 is predetermined, uniformly spaced convolutions.

Figure 3:
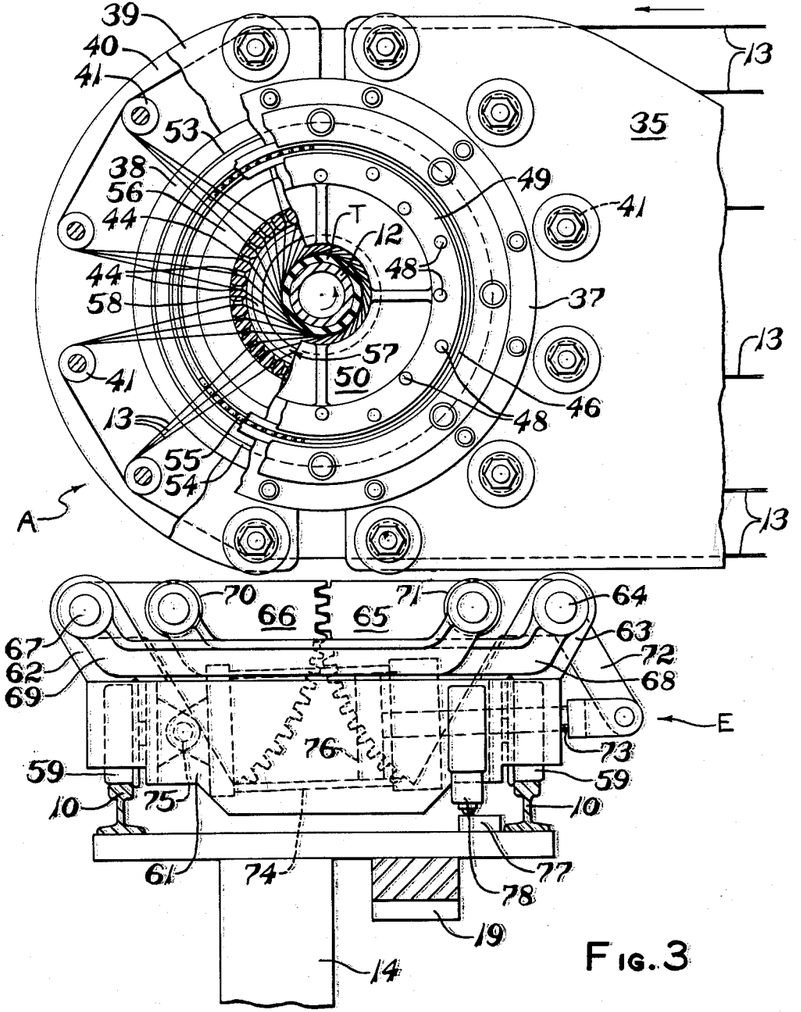
FIGURE 3 is a fragmentary, side elevational view with portions cut away showing the distribution of wire as it is formed and trained to the winding mandrel, this view also showing details of one of the mandrel supporting assemblies in its non-supporting position.
Figures 6, 7, 8:
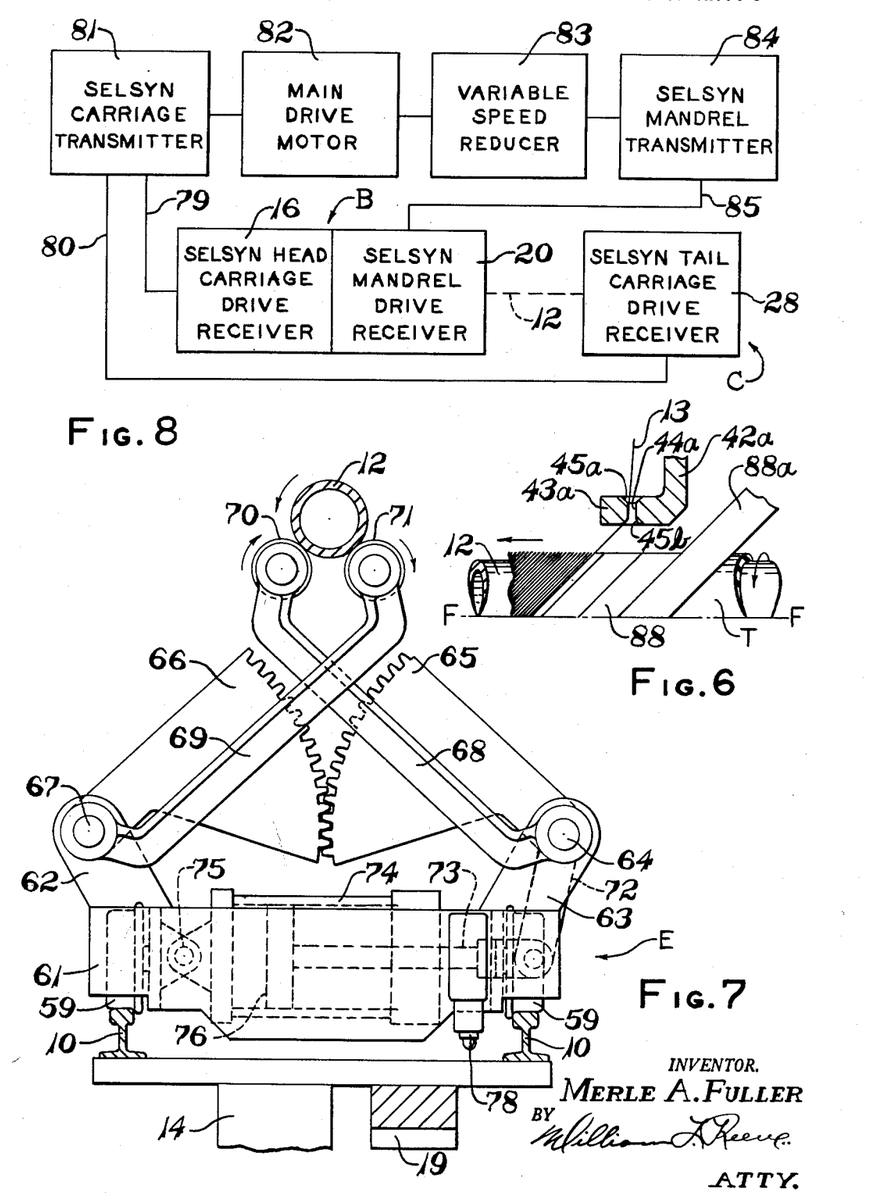
FIGURE 6 is a fragmentary view, similar to FIGURE 5, showing an alternative means for distributing and forming the wire without separate forming members.
FIGURE 7 is a side elevational view of the mandrel supporting assembly shown in FIGURE 3, in its mandrel supporting position.
FIGURE 8 is a schematic block diagram of the various drive and control units illustrating their operating relationships.

Connected to the head chuck drive assembly B are a plurality of mandrel support trucks E which are mounted for movement along tracks 10. The assemblies E are normally in their extended, mandrel supporting position as shown in FIGURE 7, but are caused to retract, as shown in FIGURE 3, as they approach and pass beneath the wire forming and distribution assembly A, once again being extended to support the mandrel 12 as they pass assembly A.

*Chuck assemblies*

Figures 1, 2:
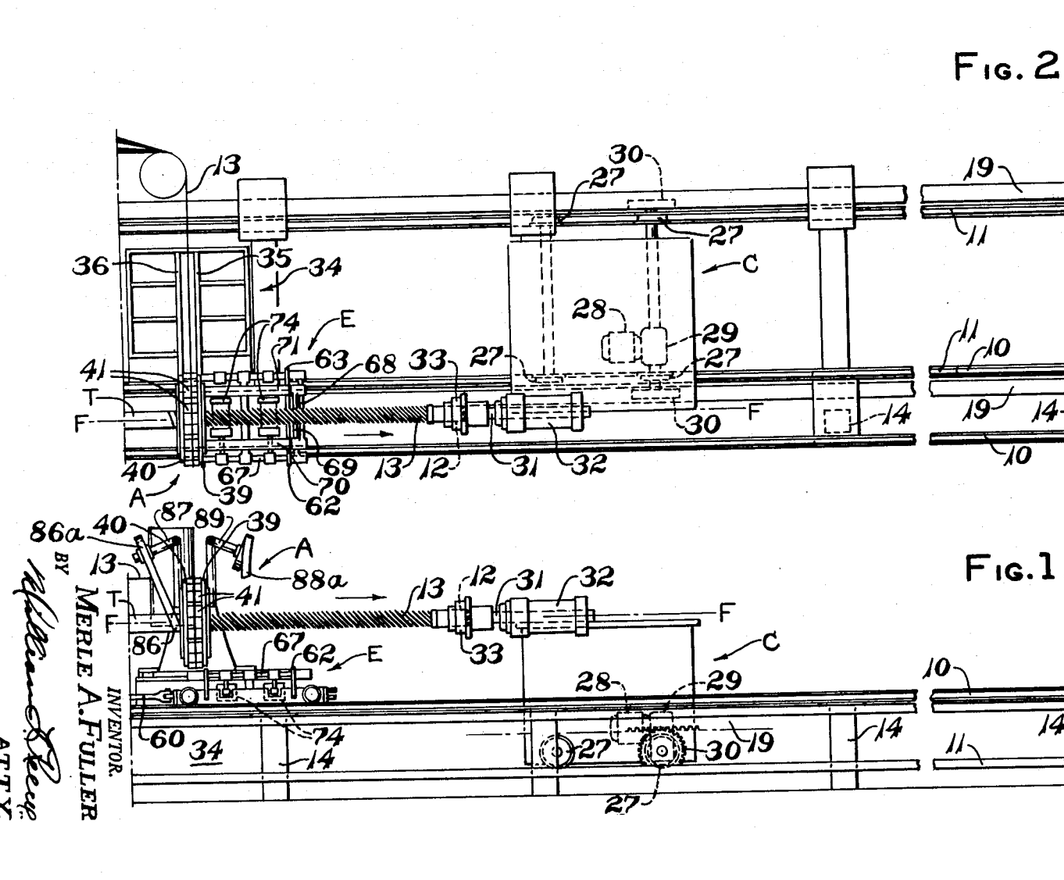
FIGURES 1a and 1b together comprise a front elevational view of the apparatus showing a partially completed ply of reinforcement material being wound about a winding mandrel.
FIGURES 2a and 2b together comprise a plan view of the apparatus as shown in FIGURES 1a and 1b.
Figure 1A:
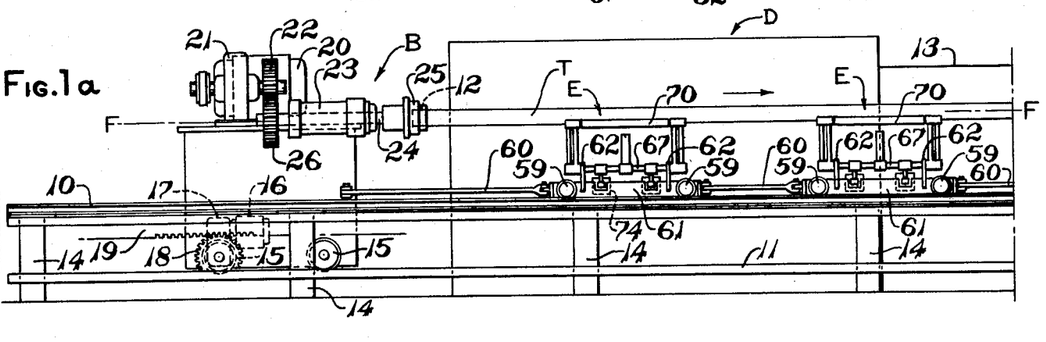
Figure 2A:
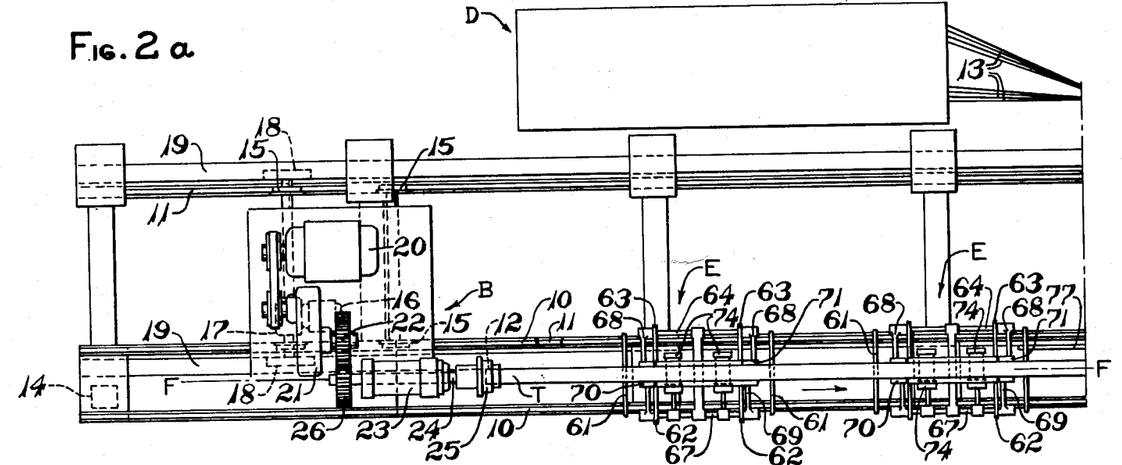

As seen in FIGURES 1 and 2, two pairs of guiding tracks 10 and 11 extend horizontally from end to end of the apparatus. Tracks 11 are wide spaced in parallel relationship to one another and are mounted on vertical stanchions 14. Mounted above tracks 11 and parallel thereto are the relatively closely spaced tracks 10. As will be seen in FIGURES 1 and 2, the tracks 10 are mounted toward the front of the apparatus.

Movably mounted on tracks 11 by means of tracking wheels 15 is the head chuck drive assembly B. Mounted within assembly B is a selsyn receiver motor 16, the output of which is connected through a reducer 17 to a pinion drive gear 18. Pinion 18 is engaged with a rack 19 mounted beneath one of the tracks 10 and extending from end to end of the apparatus. Thus, as the selsyn receiver 16 is actuated, the chuck drive assembly B may be moved along tracks 11 in either direction. Mounted on the upper side of assembly B is a selsyn mandrel drive receiver motor 20, the output of which is connected through a reducer 21 to a transmission gear 22. Rotatably journalled in the bearing block 23 above assembly B is a chuck drive shaft 24. Mounted on the outer end of drive shaft 24 is an adjustable chuck 25 for gripping the ends of a mandrel 12. On the other end of drive shaft 24 is mounted a transmission gear 26 meshed with transmission gear 22. Thus, mandrel 12 may be rotated about its longitudinal axis in response to actuation of the selsyn receiver motor 20.

The tail chuck drive assembly C is also mounted for movement on tracks 11, similarly to assembly B, by means of tracking wheels 27. Also mounted within assembly C is a selsyn motor receiver 28, the output of which is connected through a reducer 29 to a pinion gear 30, also engaged with the rack 19. Rotatably mounted on the upper side of assembly C is a chuck supporting shaft 31 which is journalled in a bearing block 32. Mounted at one end of shaft 31 is a mandrel chuck 33 for supporting the other end of a mandrel 12.

*Wire forming and distribution assembly*

Centrally located in the apparatus, approximately midway of the tracks 10 and 11 and positioned above tracks 10, is the wire forming and distribution assembly A. The main working portion of assembly A is supported in cantilever fashion above tracks 10 by means of a supporting frame 34. The frame 34 has a bifurcated portion consisting of two vertically spaced portions 35 and 36 which extend approximately to the axis line of chuck drive shafts 24 and 31. Mounted on portion 35 is a supporting ring member 37. A similar ring member 38 is mounted on frame portion 36. Mounted on ring member 37 in the same plane as frame portion 35 is a semi-circular member 39. Similarly mounted on ring member 38 and in the same plane as frame member 36 is a semi-circular member 40. It will be seen that members 39 and 40 form, in effect, continuations of frame portions 35 and 36, respectively, which may be removed for access to the inner working portions of assembly A. It is also desirable to remove these portions when building hose with built-on flanges of a diameter too large to pass through the normal wire forming and distribution portions of assembly A. In such case heavy wire or cables may be trained to the partial hose carcass by conventional means from the front of the apparatus. Rotatably mounted between frame portions 35 and 36 and members 39 and 40 are wire guiding rollers 41. The axes of rollers 41 are arranged in equally spaced circumferential relationship about the central axis F—F, defined by the axis of chuck drive shafts 24 and 31. Mounted on supporting ring 37 within assembly A is a wire spacing member 42 having a cylindrical portion 43, the axis of which coincides with axis F—F. Formed in the cylindrical portion 43 are a plurality of radial passageways 44, at least equal in number to the number of wires 13 to be trained to the mandrel 12. The inner and outer ends of passageways 44 are countersunk as at 45 to avoid any sharp deformation of the wire 13 being drawn therethrough.

Figure 4:
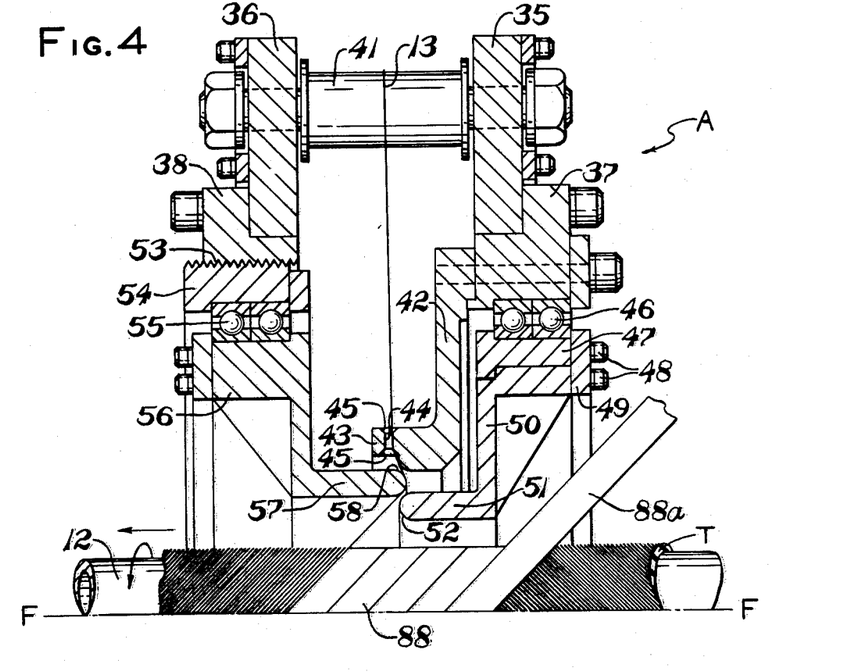
FIGURE 4 is an enlarged fragmentary view in axial section through a portion of the wire distribution and forming means as shown in FIGURE 3.
Figure 5:
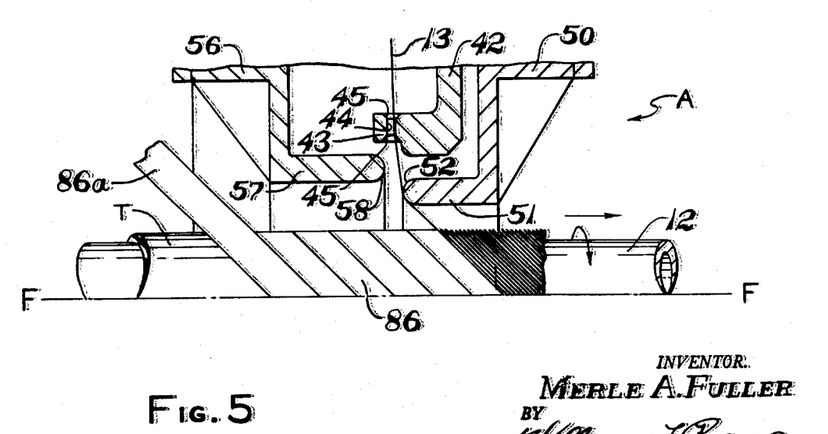
FIGURE 5 is a fragmentary view, similar to the lower portion of FIGURE 4, but showing an alternative position for the wire forming members as wire is wound in a direction opposite to that shown in FIGURE 4.

Rotatably journalled within supporting ring 37 by means of bearings 46 is another ring member 47. Removably mounted within ring member 47 by means of bolts 48 and keeper ring 49 is a wire forming ring member 50. Ring member 50 has a cylindrical portion 51, the axis of which coincides with F—F and is located within the cylindrical portion 43 of the wire spacing member 42. At the inner end of the cylindrical portion 51 is formed a hemi-toroidal wire forming surface 52. As seen in FIGURE 5, as the mandrel 12 is moved to the right the wire 13 is bent sharply about surface 52 in such a manner that the wire is preformed to a helix of predetermined diameter.

Mounted on the supporting ring 38 by means of threads 53 for movement axially of member 38 is a ring member 54. Journalled within ring member 54 by means of bearings 55 is another wire forming ring member 56 having a cylindrical portion 57, the axis of which coincides with axis F—F. The inner end of portion 57 has formed thereon a hemi-toroidal wire forming surface 58. The dimensions of member 56 are such that the surface 58 may be interposed between the surface 52 of the forming ring member 50 and the radial wire passageways 44 in the wire spacing member 42. It will be seen in FIGURE 4 that in winding wire 13 on the mandrel 12 as the mandrel is moved to the left, that the desired cast may be preformed in the wire 13 by moving member 56 inwardly by means of threads 53 so that surface 58 is located in the position shown. With some wires it may be necessary to move forming member 56 inward sufficiently so that wire 13 may be drawn over both surfaces 52 and 58 to impart the desired amount of cast, or preforming, to the wire 13.

In forming heavier wires having particularly difficult preforming characteristics, and in utilizing the apparatus for winding textile cords, it has been found desirable to utilize a combination spacing and forming member 42a, as shown in FIG. 6, without using separate ring members such as 47 and 50. The combination member 42a has a cylindrical portion 43a, the axis of which coincides with axis F—F, and having an inside diameter as near to the outside diameter of the last ply of wire 13 as practicable. A plurality of radial passageways 44a are formed in the cylindrical portion 43a. The outer ends of passageways 44a are countersunk as at 45a to avoid dragging or sharp deformation of the wire 13 or textile cord being drawn therethrough. The inner ends of passageways 44a are radiused as at 45b to create a forming surface capable of preforming wire 13 drawn therethrough to a predetermined diameter helix.

*Mandrel support truck assemblies*

In the manufacture of long lengths of hose of large diameter the use of long heavy mandrels is necessitated. Without intermediate support of the mandrels between the mandrel supporting chucks 25 and 33 the mandrel will tend to sag in the center, causing variations in the amount of preforming and disruption of the wire spacing as the mandrel is passed through the working portion of assembly A. As will be seen in the drawings, the support assemblies E which accomplish this support are movably mounted on tracks 10 by means of tracking wheels 59. The supporting assemblies are connected to one another and also to the head chuck drive assembly B by means of connecting rods 60. Thus, as the chuck drive assembly B is moved along tracks 11 the supporting assemblies E move at the same speed along tracks 10. The supporting assembly comprises a frame 61 on which the tracking wheels 59 are rotatably mounted. Pairs of vertical supporting members 62 and 63 are mounted on both front and rear, respectively, of the assemblies. Rotatably mounted between members 63 is a shaft 64. Mounted on shaft 64 in the central portion thereof is a segment of a spur gear 65. A similar spur gear segment 66 engaged with segment 65 is mounted on the central portion of a shaft 67 rotatably mounted between vertical support members 62. Mounted on shafts 64 and 67, respectively, near the ends thereof are pairs of supporting arms 68 and 69. Rotatably mounted between the outer ends of arms 68 and 69, respectively, are mandrel supporting rollers 70 and 71. Also mounted on shaft 64 is a connecting arm 72 which is pivotally connected to the outer end of a piston rod 73 of a double acting fluid pressure cylinder 74 which is pivotally connected to the rear of frame 61 as at 75. In the mandrel support position of assembly E, as shown in FIGURE 7, fluid under pressure is supplied to the right side of piston 76 of the cylinder 74, forcing it to its dotted line position. As the supporting assembly E approaches the wire forming and distribution assembly A the rollers 70 and 71 must be lowered to pass beneath the lower portions of the frame members 35 and 36. To accomplish this a raised switching strip 77 is mounted alongside of and beneath the frame portions 35 and 36 of assembly A. As assembly E approaches and moves under frame portions 35 and 36 a limit switch 78 mounted on each assembly E engages the switching strip 77, operating a solenoid valve, not shown, to allow fluid to be exhausted from the right side of piston 76 and to be admitted under pressure to the left side of the piston. As piston 76 is moved to its position, as shown in FIGURE 3, piston rod 73 is moved outward causing shaft 64 and gear segment 65 mounted thereon to be rotated partially in a counterclockwise direction. The engagement of gear segment 65 with that of segment 66 simultaneously causes the clockwise rotation of shaft 67. As shafts 64 and 67 are thus rotated, arms 68 and 69 are moved downward moving the supporting rollers 70 and 71 from engagement with the mandrel 12. In reverse fashion, as limit switch 78 disengages the switching strip 77, piston 76 is returned to its position as shown in FIGURE 7 again raising the supporting rollers 70 and 71 to supporting engagement with the mandrel 12.

Control description

In the manufacture of high pressure hydraulic hose to critical specifications it is imperative that wire spacing and preforming are closely maintained. It is necessary, therefore, that in moving the mandrel 12 axially through the apparatus that a uniform pushing and pulling cooperation of the head and tail chuck assemblies B and C be effected with positive synchronization of their movement. With reference to FIGURE 8 it will be seen that the selsyn head carriage drive receiver 16 and the selsyn tail carriage drive receiver 28 are simultaneously actuated synchronously by means of signals transmitted thereto by means of control lines 79 and 80, respectively, from a remote selsyn carriage transmitter 81, shown only schematically in FIGURE 8. The selsyn carriage transmitter is driven by the main drive motor 82, also only shown schematically in FIGURE 8. It will be seen, therefore, that in response to operation of the main drive motor 82 the head and tail carriage assemblies B and C are moved along tracks 11 simultaneously at an equal rate of speed. Also connected to the main drive motor 82 is a positive infinitely variable mechanical transmission 83, the output of which drives another selsyn transmitter 84. Selsyn transmitter 84 also located remotely from the apparatus is connected to the selsyn mandrel drive receiver 20 by a control line 85. Thus, by varying the output of the variable transmission unit 83 the speed of the selsyn drive receiver 20 may be varied with respect to the speed of movement of the mandrel head and tail drive carriages B and C.

Machine operation

In the operation of this apparatus the head drive carriage B is positioned at the left end of tracks 11 as seen in FIGURES 1 and 2. A mandrel 12 on which a tube T is mounted and having the ends thereof taped to the mandrel 12 is cradled on supporting rollers 70 and 71 and inserted in chuck 25 and gripped thereby. Tail drive assembly C is then moved to engage the other end of the mandrel 12 with chuck 33. The axis of the mandrel then coincides with axis F—F. In the event it becomes necessary to adjust the position of cradling rolls 70 and 71 for various size mandrels, the stock of piston 76 in fluid pressure cylinder 74 may be adjusted by conventional means, not shown. In certain hose constructions, in order to prevent wire or textile cord being wound on the tube T from cutting through it may be necessary to apply a loosely woven cloth mesh covering 86 which is wound about the tube T in the same operation as winding reinforcing material thereon. The covering 86 is supplied in the form of a narrow tape 86a which is supported in roll form on a spindle 87 to one side of the assembly A.

It may also be desirable to apply a thin elastomeric covering 88 between plies of the reinforcing material to prevent fretting of the plies one upon the other. This covering 88 may be supplied in the form of a narrow tape 88a which is supported in roll form on a spindle 89 to one side of assembly A and also on spindle 87, replacing tape 86a upon completion of the first reinforcement ply's application. The variable speed transmission unit 83 is adjusted to establish the rate of rotation of the mandrel 12 with respect to its speed of movement in the direction of its length. Wires 13 from the creel D are brought to the wire distribution and forming assembly A and are trained about the wire guiding rollers 41 and then through the radial passageways 44 in the wire spacing member 42. The ends of the wires 13 are then connected to the right end of the mandrel 12 as viewed in FIGURES 1 and 2 and are bound thereto by tape or other gripping means, not shown. The relative position of forming ring members 50 and 56 are adjusted as desired and the main drive motor 82 is actuated. The selsyn carriage transmitter 81 is actuated for direct response to the main drive motor 82 and transmits a signal to the selsyn head carriage drive receiver 16 and the selsyn tail carriage drive receiver 28 causing them to move assemblies B and C along track 11 simultaneously with matched speed. The selsyn transmitter 84 operates through the variable speed transmission unit 83 causes the selsyn mandrel drive receiver 20 to rotate the mandrel 12 in uniformly timed relationship to the speed of movement of assemblies B and C. As the chuck 25 approaches the wire distribution and forming assembly A the operator reverses the operation of the main drive motor 82 causing assemblies B and C to reverse direction from right to left, as viewed in FIGURES 1 and 2. The wire 13 being spiraled about the mandrel 12 and tube T spirals back upon itself without the necessity for being clamped and rigidly holds the end of the first ply of the wire in place. The operator may allow the carriages B and C to continue moving from right to left to complete the second ply of wire reinforcement. It may be necessary in certain constructions to wind an insulating strip of elastomeric material over the first ply of wire reinforcement just ahead of the wire forming and distribution assembly A as the second ply of wire is being applied. The winding operation may be continued in reverse fashion from end to end of the mandrel without stopping to bind or clamp the wires until all plies have been spiraled on to the hose carcass. Upon the completion of the application of the last ply of wire the wire may be taped or otherwise clamped to the underlying hose carcass and the ends of the wire cut at that time. The mandrel may then be removed from the apparatus for further processing operations such as the application of the hose cover and vulcanization.

I claim:

1. Apparatus for winding at least one strand of filamentary material in preselected reverse helical paths about a winding mandrel; comprising a winding mandrel; chuck means releasably engageable with each of said mandrel and movably mounted on said apparatus; means to rotate said chuck means and a mandrel engaged thereby; filamentary material letoff means; filamentary material guiding means concentrically mounted about the axis of said mandrel engaged by said chuck means, further comprising a plurality of concentric filamentary material engaging portions mounted for rotatable movement relative to said axis; and means to move said chuck means relative to said guide means in reverse directions axially of the axis of rotation thereof.

2. Apparatus for manufacturing flexible, filament reinforced hose; comprising a mandrel for supporting a partial hose carcass; filament supply means from which a plurality of resilient filaments may be trained to a hose carcass on said mandrel; a first chuck means movably mounted on said apparatus engageable with an end of said mandrel; a second chuck means movably mounted on said apparatus for engagement with the other end of said mandrel; means to move said first chuck means in directions axially of the axis of said mandrel supported thereby; means to move said second chuck means in directions axially of said axis in timed relationship to the axial movement of said first chuck means; means to rotate at least one of said chuck means about said axis to rotate said mandrel engaged thereby and the other of said chuck means in timed relationship to the rate of axial movement of said one of said chuck means; filament guiding means to guide said filaments from said supply means to said partial hose carcass comprising an annular support member mounted on said apparatus coaxially with said axis, filament distribution rollers rotatably mounted on said support member in equally spaced relationship, a filament spacing member mounted on said support member having openings formed therethrough radially of said axis in equally spaced relationship and corresponding in number to at least the number of said filaments being guided to said partial hose carcass, whereby said filaments may be wound upon said partial hose carcass in helical convolutions of predetermined pitch; and support means to support said mandrel with the partial hose carcass at at least one location intermediate the ends of said mandrel.

3. Apparatus for manufacturing flexible, wire reinforced hose; comprising a mandrel for supporting a partial hose carcass; wire tensioning and supply means from which a plurality of resilient wires may be individually tensioned and supplied to said hose carcass; a first chuck means movably mounted on said apparatus, engageable with an end of said mandrel; a second chuck means movably mounted on said apparatus for supporting engagement with the other end of said mandrel; means to move said first chuck means in directions axially of the axis of said mandrel engaged by said chuck means; means to move said second chuck means in directions axially of said axis; selsyn means to match the direction and rate of movement of said chuck means axially of said axis; rotation means to rotate at least one of said chuck means about said axis to thereby rotate said mandrel and the other of said chuck means about said axis; means to vary the speed of rotation of said rotation means relative to the rate of movement of said chuck means and mandrel axially of said axis whereby wire supplied to said carcass may be wound thereon in helical convolutions of predetermined pitch; guide means to guide said wire supplied to said carcass to the surface of said carcass; and support means to support said mandrel and hose carcass at at least one location intermediate the ends of said mandrel.

4. Apparatus as defined in claim 3; wherein said support means further comprises at least one truck; means mounting said truck on said apparatus for movement in directions parallel to said axis; connecting means to move said truck in said directions in response to movement of one of said chuck means axially of said axis; at least two mandrel supporting rollers movably mounted on said truck for rotation each about its longitudinal axis and for movement toward and away from said mandrel engaged by said chuck means; and means to move said rollers toward and away from supporting engagement with said mandrel in response to movement of said truck on said apparatus, while maintaining equal distances between each of said rollers and said mandrel during movement of said rollers.

5. Apparatus as defined in claim 3; wherein said guide means further comprises an annular support member mounted on said apparatus coaxially of said axis; wire distribution rollers rotatably mounted on said support member for rotation each about an axis parallel to said first mentioned axis; a wire spacing member mounted on said support member and having a number of openings, corresponding to the number of wires being guided to said partial hose carcass, formed therethrough radially of said first-mentioned axis in equally spaced relationship; and wire forming means mounted on said support member for progressively reversely bending each of said wires as each wire is moved in the direction of its length through said guide means.

6. Apparatus as defined in claim 5; wherein said wire forming means further comprises a rotatable annular-forming sleeve having an approximately hemi-toroidal surface formed thereon, and an inside diameter greater than the outside diameter of the partial hose carcass following helical winding of the wire thereon; and a rotatable annular casting sleeve having an approximately hemi-toroidal surface formed thereon; and means to move said casting sleeve to and from a position for wire bending cooperation with said forming sleeve.

7. Apparatus for winding filamentary material in helical form comprising a cylindrical mandrel releasably supported adjacent its ends, means for rotating said mandrel about its axis and to move it axially in either direction, means for supplying a plurality of filaments to be wound upon said mandrel, filament guide means surrounding said mandrel intermediate its ends and including circumferentially equally spaced surfaces extending radially inwardly for guiding the filaments into paths extending substantially radially relative to said mandrel, the said guide means further including a pair of concentric radially spaced annular surfaces disposed on axially opposite sides of said circumferentially equally spaced radially extending surfaces of said filament guide means for deflecting the filaments into oblique paths relative to the surface of the mandrel to thereby effect helical winding of the filaments on the mandrel in either direction of its axial movement.

8. Apparatus as defined in claim 7 wherein the said annular surfaces are provided upon cylindrical flanges mounted upon a common support with the said flanges directed toward each other, and means are provided for axial adjustment of one of said flanges relative to the other.

9. Apparatus for winding filamentary material in helical form comprising a cylindrical mandrel releasably supported adjacent its ends, means for rotating said mandrel about its axis and to move it axially in either direction, means for supplying a plurality of filaments to be wound upon said mandrel, axially stationary filament guide means surrounding said mandrel intermediate its ends and including a first cylindrical member provided with circumferentially equally spaced radially extending openings for directing said filaments in paths extending radially relative to said mandrel, a pair of concentric radially spaced cylindrical flanges between said mandrel and the said first cylindrical member, the said cylindrical flanges having rounded ends disposed adjacent each other on axially opposite sides of the radially guided filaments for deflecting the filaments into oblique paths relative to the surface of the mandrel to thereby effect helical winding of the filaments on the mandrel in either direction of its axial movement.

10. Apparatus as defined in claim 9 and further comprising means to adjust the axial position of the rounded end of at least one of the said cylindrical flanges.

11. Apparatus for winding filamentary material in helical form comprising track means, a pair of chucks individually supported in spaced axial alignment on said track means for translational movement therealong and rotation about an axis parallel therewith, a cylindrical mandrel releasably supported adjacent its ends by said chucks, means to rotate at least one of said chucks to thereby rotate said mandrel, means to supply translational movement in either direction simultaneously to both of said chucks, means for supplying a plurality of filaments to be wound upon said mandrel, filament guide means surrounding said mandrel intermediate said chucks and including circumferentially equally spaced surfaces for guiding the filaments into paths extending substantially radially relative to said mandrel, the said guide means further including a pair of concentric radially spaced annular surfaces disposed between said mandrel and the circumferentially spaced guiding surfaces on axially opposite sides of the radially guided filaments for deflecting the filaments into oblique paths relative to the surface of the mandrel to thereby effect helical winding of the filaments on the mandrel in either direction of its axial movement.

12. Apparatus as defined in claim 11 further comprising mandrel support means axially movable with said chucks and engageable with said mandrel intermediate its ends to provide a rotatable support therefor, and means actuated by movement of said mandrel support means to a location adjacent said guide means for moving said mandrel support means from engagement with the mandrel.

References Cited by the Examiner

UNITED STATES PATENTS

| | | | |
|---|---|---|---|
| 575,398 | 1/97 | Huestis | 57—11 X |
| 1,336,649 | 4/20 | Musson | 57—11 |
| 2,156,652 | 5/39 | Harris | 57—9 X |
| 2,656,873 | 10/53 | Stephens | 57—140 |
| 3,032,461 | 5/62 | Baker et al. | 57—11 X |
| 3,037,343 | 6/62 | Haas et al. | 57—9 |
| 3,125,483 | 3/64 | De Ganahl | 156—175 X |

MERVIN STEIN, *Primary Examiner.*

UNITED STATES PATENT OFFICE
CERTIFICATE OF CORRECTION

Patent No. 3,187,494                        June 8, 1965

Merle A. Fuller

It is hereby certified that error appears in the above numbered patent requiring correction and that the said Letters Patent should read as corrected below.

Column 2, line 46, for "is" read -- in --; column 4, line 22, for "characteistics" read -- characteristics --; column 6, line 63, after "each" insert -- end --.

Signed and sealed this 31st day of May 1966.

(SEAL)
Attest:

ERNEST W. SWIDER                        EDWARD J. BRENNER
Attesting Officer                          Commissioner of Patents